(12) United States Patent
Slafer et al.

(10) Patent No.: US 10,675,824 B2
(45) Date of Patent: Jun. 9, 2020

(54) METHODS AND APPARATUS FOR FORMING POLARIZED FILMS AND GLASSES

(71) Applicant: MICROCONTINUUM, INC., Cambridge, MA (US)

(72) Inventors: W. Dennis Slafer, Arlington, MA (US); Christine Higgins, Acton, MA (US); B. Diane Martin, Somerville, MA (US)

(73) Assignee: MicroContinuum, Inc., Cambridge, MA (US)

( * ) Notice: Subject to any disclaimer, the term of this patent is extended or adjusted under 35 U.S.C. 154(b) by 244 days.

(21) Appl. No.: 15/864,827

(22) Filed: Jan. 8, 2018

(65) Prior Publication Data

US 2018/0194091 A1   Jul. 12, 2018

Related U.S. Application Data

(60) Provisional application No. 62/443,197, filed on Jan. 6, 2017.

(51) Int. Cl.
| | | |
|---|---|---|
| *B29D 11/00* | (2006.01) | |
| *G02B 5/30* | (2006.01) | |
| *B29K 669/00* | (2006.01) | |
| *B29K 709/08* | (2006.01) | |
| *B29K 629/00* | (2006.01) | |
| *B29K 601/00* | (2006.01) | |

(52) U.S. Cl.
CPC .... *B29D 11/00644* (2013.01); *B29D 11/0073* (2013.01); *B29D 11/00903* (2013.01); *G02B 5/305* (2013.01); *B29K 2601/12* (2013.01); *B29K 2629/04* (2013.01); *B29K 2669/00* (2013.01); *B29K 2709/08* (2013.01)

(58) Field of Classification Search
CPC ........ B29D 11/00644; B29D 11/00903; G02B 5/305
See application file for complete search history.

(56) References Cited

U.S. PATENT DOCUMENTS

| | | | |
|---|---|---|---|
| 2,281,101 | A | 4/1942 | Land |
| 2,289,714 | A | 7/1942 | Land |
| 2,348,912 | A | 5/1944 | Land |
| 5,051,309 | A | 9/1991 | Kawaki et al. |
| 5,552,182 | A | 9/1996 | Scarpetti |
| 5,591,508 | A | 1/1997 | Scarpetti |
| 5,758,036 | A | 5/1998 | Scarpetti |
| 5,764,248 | A | 6/1998 | Scarpetti |
| 6,013,123 | A | 1/2000 | Scarpetti |
| 6,347,851 | B1 | 2/2002 | Scarpetti |

(Continued)

*Primary Examiner* — Scott W Dodds
(74) *Attorney, Agent, or Firm* — Cesari and McKenna, LLP (57) ABSTRACT

Methods are disclosed for forming polarized films and glasses having polarization efficiency that is varied in a predetermined design. In particular, such designs include monochrome and color polarization density gradients, where the non-polarized areas of films and glasses allow viewing of polarized displays without distortion. The methods include forming films and glasses that have visually uniform density while still incorporating polarization gradients. The disclosed methods also enable creation of polarization filters and glasses with increased optical density and reduced glare from multiple angles.

18 Claims, 7 Drawing Sheets

(56) References Cited

U.S. PATENT DOCUMENTS

| | | |
|---|---|---|
| 6,716,294 B1 | 4/2004 | Vetrini et al. |
| 7,374,282 B2 | 5/2008 | Tendler |
| 2010/0245998 A1 | 9/2010 | Walworth et al. |
| 2013/0127897 A1 | 5/2013 | Baker et al. |
| 2016/0253018 A1* | 9/2016 | Yin .................. G02B 5/305 |
| | | 345/173 |
| 2016/0291213 A1* | 10/2016 | Yoshida ............ G02B 5/305 |
| 2016/0297836 A1* | 10/2016 | Koripelly ......... C07D 498/10 |
| 2018/0290408 A1* | 10/2018 | Park ............... G02B 5/3033 |

\* cited by examiner

METHODS AND APPARATUS FOR FORMING POLARIZED FILMS AND GLASSES

CROSS-REFERENCE TO RELATED APPLICATION

This application is based upon and claims priority to U.S. provisional patent application 62/443,197, entitled "METHODS AND APPARATUS FOR FORMING POLARIZED GLASSES", filed Jan. 6, 2017; The entire content of this noted provisional application is incorporated herein by reference.

BACKGROUND OF THE INVENTION

The use of glasses which incorporate polarization for glare reduction have been known for many years[1]. More recently, proliferation of electronic devices having some form of information display (laptops, tablets, smart phones, watches, etc.) has proliferated, and many of these displays incorporate polarizing elements, particularly liquid crystal displays (LCD) in widespread use. Viewing displays with polarizing elements through polarizing glasses can result in unwanted optical effects, such as display darkening, color fringes, etc., due to absorption of polarized light as a function of the relative angle of the polarizing elements and the wavelength dependence of this effect. Stress in films also produces unwanted polarization artifacts. These effects can degrade the viewing quality of such displays when wearing polarizing sunglasses.

One approach used to address this problem is by using glasses with graded polarization, where, for example, the upper portion of the lens is polarizing and the lower portion is non-polarizing (Tendler). This enables displays with polarizing elements to be viewed without interference through the clear portion of the glasses but does not offer sun protection for this portion of the lens. Tendler also does not describe a practical means to provide for the graded polarization effect, or sun blocking for the non-polarized portion of the lens.

Another limitation of the current technology is the inability to cost-effectively produce filters with graded polarization. Several solutions have been proposed, such as to use a "bifocal" approach in which the top half of the lens is polarizing, and the lower half is non-polarizing. Here the sharp demarcation between the polarized and non-polarized parts of the lens produces an undesirable visual effect. Another method includes thermal bleaching of the iodine-imbibed polyvinyl alcohol polarizing film, which reduces light absorption. This process is difficult to control and can produce residual polarizing ('stain') in the areas of the lens that are to be non-polarizing.

Another limitation of the present technology for producing polarization gradients is that a very limited color palette is available for lenses and filters (typically neutral to greenish or bluish tones). For example, much of the market for sunglasses is in the fashion sector, thus the inability to produce a wide range of custom colored polarized glasses limits the applications for polarized fashion sunglasses.

Yet a further limitation with conventional polarizing sunglasses is that the lenses typically must have a specific polarization orientation to block a particular source of glare (i.e., from horizontally for roadway glare or vertically for windows and doors of buildings and cars, and etc.). Conventional polarized glasses cannot simultaneously block both such sources of glare. That is, polarizing sunglasses only block the glare from the roadway while transmitting glare from cars and buildings, and vice versa.

One way known to the art to produce polarization images, including gradients, is through the use of ink-jet printing (Scarpetti). In this process, a dichroic (polarization inducing) ink is applied to a polyvinyl alcohol (PVA) film (or other such films know to the art, such as olyvinyls acetals, polyvibnyl ketals, polyhydroxy alkanes, etc. (BINDA) that has been 'oriented' by stretching in one direction, thereby aligning the molecules predominantly in the stretch direction (Land, etc.), and then laminated to a non-polarizing support (cellulose tri-acetate [CTA or TAC, Land], or polycarbonate (Misubishi, Vertronelli . . . ) to stabilize the stretched PVA film and retain the molecular orientation. The dichroic ink, which consists of a solution (typically aqueous) of a dichroic dye, solvent, surfactants, anti-foaming agents, etc. is applied to the (clear) oriented PVA film, such that the dye imbibes (migrates) into the PVA and becomes associated with the oriented polyvinyl moiety. There are several problems with forming a polarized using dichroic ink printing: one is that only a small percentage of the applied ink is actually incorporated into the oriented PVA structure, thus the maximum density ("Dmax") can be limited and achieving very dark sun glasses can very difficult using this approach. Another is that the lamination of the highly stretched PVA film to a CTA support results in a high degree of curl in the laminated product. Curl can be minimized by either using very thick CTA (>5 mils) or by using a 'balanced' structure with one layer of PVA on each side of a CTA support core. However, these approaches result in a thicker and stiffer film that is difficult to mold. And results in a thicker film that can be objectionable when thin, lightweight sunglasses are desired. Further, the addition of an extra PVA layer adds to the material and labor costs. While the addition of a second PVA layer can provide a second polarizing surface for achieving higher density, it is at the expense of the thicker and heavier lenses. The extra layer of PVA will also produce an additional interface that has the potential to be a source of undesirable artifacts, such as particulate inclusion, lamination failure and Fresnel interface reflections.

What is needed is a method for producing improved polarizing sunglasses and filters that allow undistorted viewing of displays having polarizing elements, that can seamlessly incorporate regions of non-polarizing light blocking, that can provide gradients and images in a wide range of colors, that are thin and lightweight, and that can block glare from a wide range of surface orientations. The current disclosure overcomes all of the above limitations.

SUMMARY

Embodiments of the present disclosure remedy the above shortcomings of the current art by providing methods for producing polarized glasses with polarization gradients in single and multiple colors, as well as logos and other types of monochrome and color images. Such glasses can have increased optical density and clarity, minimized weight, and further can be configured to reduce glare originating from sources at multiple angles.

An aspect of the present disclosure provides an improved method is described for forming a polarized image pattern on a substrate using graphic arts techniques, in particular ink jet printing or other printing methods (gravure, flexographic), by the controlled application of a dichroic dye to an oriented (stretched) polyvinyl alcohol substrate. A critical aspect of the current disclosure is an improved means for causing the imbibition of the dichroic dye into the oriented substrate through the use of a polymer control layer coated onto the PVA layer and by the physical conditions under which it is used. The control layer provides a method to retain the ink in the location to which it is applied by acting as a reservoir ('sponge') layer to both immobilize the ink and retain a larger volume of ink for subsequent and relatively slow process of imbibition into the PVA film. Without said control layer, ink beads up and rolls off the surface of the PVA film, producing a very poor image. The control layer not only acts to hold the ink in its target location but also acts as an ink reservoir, making more ink available for imbibing into the PVA layer to produce higher polarization density (extinction). However, it is further an aspect of the present disclosure that control of the temperature and humidity is critical in increasing dye uptake to enable faster image formation (shorter production cycles) and higher optical densities than would be possible without elevated temperature (60-75 C) and elevated humidity (>75% RH). This greatly improves the manufacturability and commercial value of sunglasses made using the aspects of the disclosure of reduced manufacturing costs and increased product variety.

Another aspect of the present disclosure is a method to increase the ink uptake of the oriented PVA layer to produce polarized filters with higher optical density (higher polarization efficiency). In many commercial oriented PVA manufacturing processes, chemical treatment of the PVA, such as by the use of boric acid and/or other chemicals and chemical combinations, significantly reduce the amount of polarizing ink (dichroic dyes or iodine) that can be imbibed into the oriented PVA layer, resulting in reduced polarization efficiency. The method involves pre-soaking the oriented PVA film in a basic solution (NaOH, KOH, $NH_4OH$, etc.), optionally with additional agents such as surfactants, defoamers, buffers, etc., for a few seconds up to a few minutes, followed by optional neutralization, then rinsing and drying. Such treated PVA films show a significant uptake of both iodine and dichroic dyes, achieving a higher maximum optical density and with a decreased imbibition time. Polymer coatings, such as CMC, etc., can then be used to improve the uniformity of the subsequent dichroic ink printing. Under such processing and printing conditions, heating (approximately 85 F) of the printed substrate, particularly in a high humidity environment, will further accelerate the ink imbibition process.

Other aspects of the present invention, including the ability to form monochrome and multi-color gradients, polarization gradients with constant visual density, glare reduction at multiple angles, thin polarized image layers, patterns with increased optical density and polarization efficiency, and others will be described in subsequent sections.

DETAILED DESCRIPTION OF THE DRAWINGS

Figure 1:
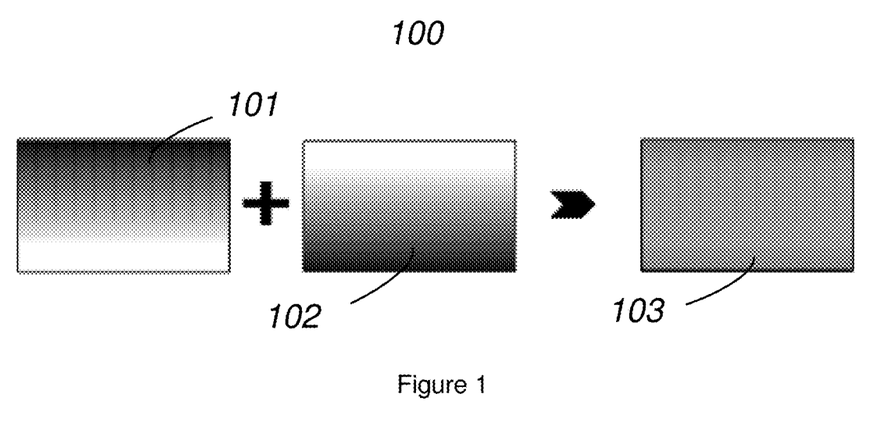
FIG. 1 Method for forming constant-density filter with polarized top region and non-polarized bottom region.

In a first embodiment, shown in FIG. 1, a constant optical density polarization gradient image 103 is formed by ink jet printing using a dichroic dye of a gradient pattern 101 having maximum polarization density at the top of the image, with decreasing in density in the downward direction. A second ink jet head dispenses a second dye that is non-dichroic, i.e., forms an image 102 that is non-selective to the absorption of polarized light. The visual density of this second pattern is approximately the inverse of that formed by the first dichroic dye in that the non-polarizing ink density increases in the downward direction. This results in a filter with a visual appearance of constant density, but with a top area that blocks glare and a bottom area that acts to reduce light intensity while not interfering with the viewing of a polarized display.

Figure 2:
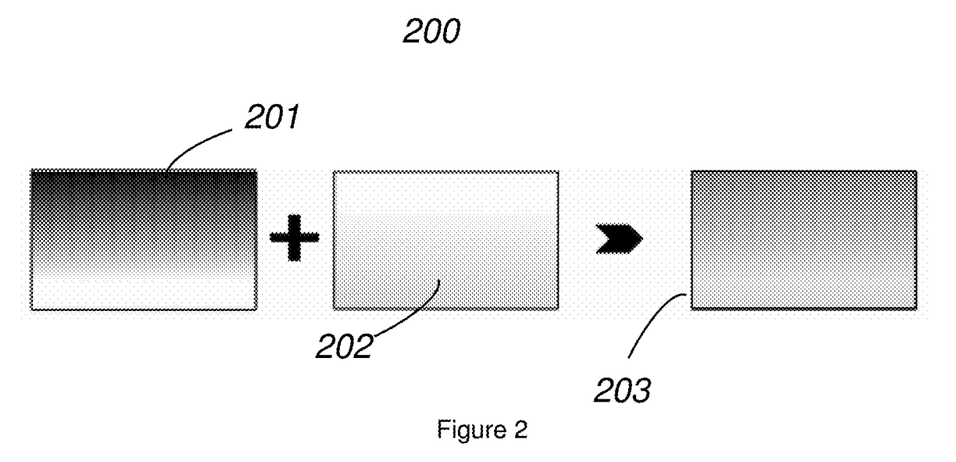
FIG. 2 depicts a method for forming 2-color filter with polarized top region of color land non-polarized bottom region of color 2.

It may be noted that the polarizing and non-polarizing elements of the filter need not be the same color or density. For example, FIG. 2 shows a dark black (or other color) polarizing area 201 at the top of the lens that fades to amber 202 (used frequently for contrast enhancement, etc.), where the amber dye is non-dichroic, or to completely clear at the bottom, 202, to allow interference-free display viewing through the non-polarized section of the lens 203.

Figure 3A:
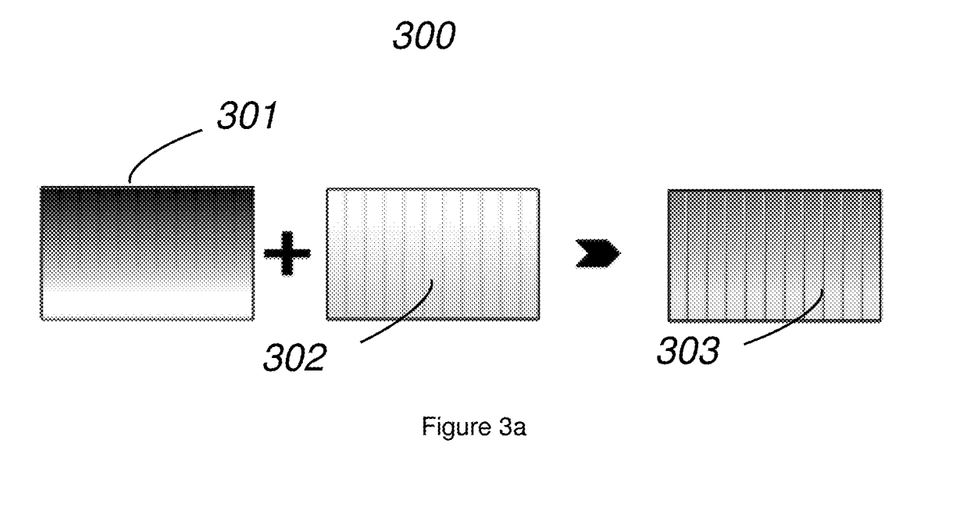
FIG. 3a depicts a method for forming 2-color gradient filter with full polarization.

As illustrated in FIG. 3a, the use of a combination of CMYK (cyan, magenta, yellow and black) dichroic inks, shown as 301 and 302, can produce virtually the same range of colors as a conventional ink jet printer, allowing multicolor polarizing gradients 303 for fashion or contrast enhancement applications. Combining dichroic and non-dichroic dyes enables fully or partially polarized patterns.

Figure 3B:
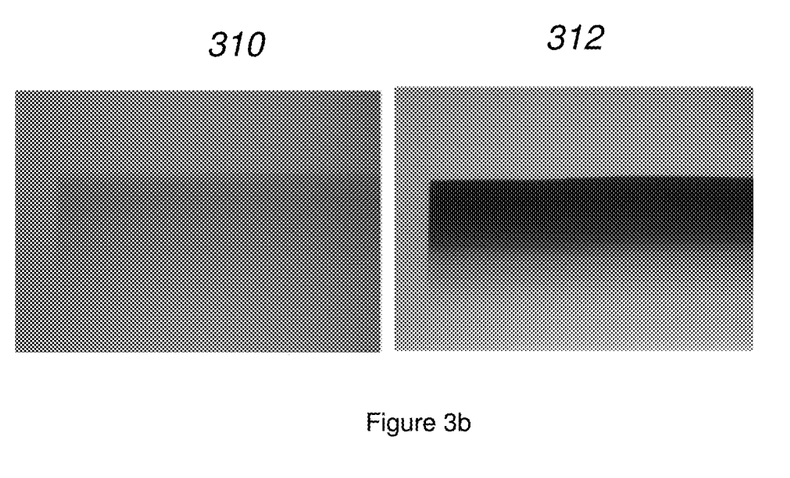
FIG. 3b shows the polarized gradient effect when viewing two orthogonally polarized light sources.

A polarized gradient made by the methods of this disclosure is shown photographically in FIG. 3b, where illumination of the gradient using light polarized in the parallel direction, 310, shows minimum blocking of the polarized light, while illumination using the orthogonally polarization, 312, shows maximum blocking of the polarized light.

Other effects that can be produced by a combination of polarizing and non-polarizing image elements include the incorporation of subtle design features, logos, etc. into a filter or lens. Anti-counterfeit measures can also be included, such as an otherwise invisible mark appearing only when viewing a polarized light source. High-resolution ink jet or other graphic arts printing with dichroic and/or non-dichroic dyes makes possible a wide range of such image possibilities.

Figure 4:
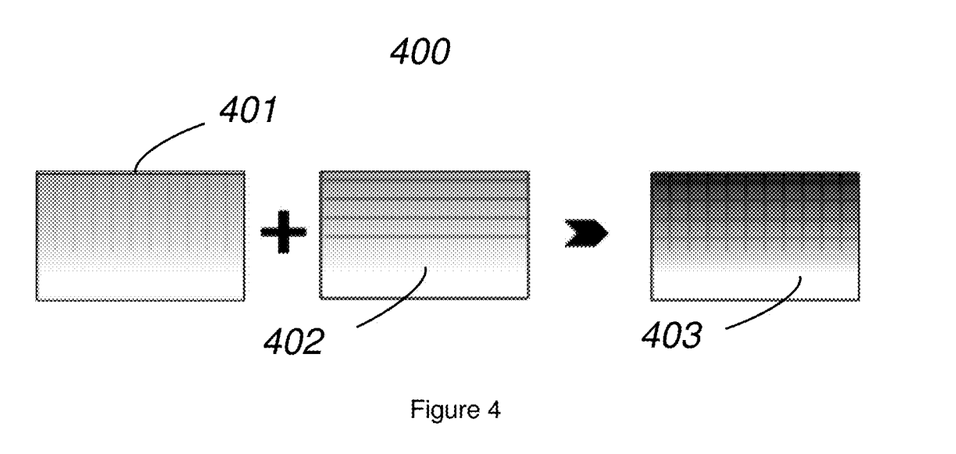
FIG. 4 depicts a method for forming 1-color gradient filter with crossed polarization for glare reduction from 2 angular sources.

In another embodiment of the present invention, shown in FIG. 4, two polarizing patterns or polarization gradients are printed on two separate films, where the printing on a first film 401 is carried out with one PVA orientation (e.g., in the 'down-web' machine direction) while a second image 402 is printed with the PVA orientation at 90 degrees to the first. Using the gradient example, the first film would act to block glare resulting from light reflection from, say, horizontal surfaces, while the other would act to block glare resulting from vertical surfaces. Printing and laminating at other angles can produce custom polarization blocking. In order to achieve a target density, each individual film can be printed at lower density such that the laminated film stack has a desired final density.

It is well known that imbibition of dye into PVA can be very slow (many hours) and the maximum amount of dye that can be absorbed is limited. Furthermore, applying ink directly to PVA results in very poor image quality due to ink de-wetting ('beading up') or 'running off' of the substrate. Thus a means of holding ink at both its target location and in sufficient volume is used to achieve suitable pattern resolution and absorbed dye density. This is conventionally achieved by the use of a layer (0.1 to 10 µm thick) of a polymeric control layer, such as carboxymethyl cellulose ("CMC"), coated over the PVA layer (with a small amount of surfactant, <1% typically, such as Triton X100, to aid in wetting). The slow uptake of dye by the PVA and resulting long processing time is very undesirable for manufacturing. It is therefore another embodiment of the present disclosure to accelerate dye uptake by the PVA through the use of moisture-controlled heating of the polymeric dye holding layer on the PVA surface. Heating of the printed substrate under conditions of elevated humidity greatly improves the dye uptake process, producing shorter dye take-up times and higher densities than achieved under conventional ambient conditions. It is speculated that due to the presence of water in the holding and/or PVA layer maintaining the dyes mobility, where heating without moisture may immobilize the dye and prevent migration more deeply into the PVA layer. This also may explain the observation that ink-jet printed dichroic dyes produce much lower image density during the winter months in cold climates, presumably due to lower humidity at this time of year. Thus heating by radiation (IR source), convection, or absorption of radiation (particularly microwave heating) in the presence of water vapor, as taught by the present invention, offers a significant improvement in polarized image formation (higher optical density and shorter imbibition times).

It is also a feature of the present disclosure to control the quality of the polarized image by controlling the diffusion of the applied dichroic ink (i.e., the dot from the ink jet head or half-tone dot from a flexographic or gravure etc. printer) using the thickness of the polymeric holding layer. A thicker layer allows more lateral diffusion of the ink dot during imbibition into the oriented substrate, resulting in a larger dyed area in the final image. This can be particularly useful in polarized gradient formation, where it is desirable to have adjacent individual printed dots merge to form a smoother continuous image (i.e., rather than a thinner layer resulting in individual dots being resolved due to decreased diffusion distance and resulting in a less smooth image).

The holding layer retains dye not imbibed (or, absorbed) into the PVA (i.e., not contributing to the polarization of light), thus this layer is convention ally removed by washing (Scarpetti) in order to eliminate such non-polarizing optical density. However, this process results in inadvertent staining of the oriented substrate resulting in color haze and other coloration defects. It is yet another embodiment of the present disclosure to remove excess (but still potentially 'active' as a stain) dichroic dyes ink/polymer through the reduced contact between the excess dye being removed and the PVA layer, particularly in areas where dye uptake is not desired. This is accomplished by the mechanical removal of excess material by lamination of an adhesive tape to the dried polymer holding layer, followed by delamination, which removes excess dyes and polymer. This is followed, as needed, by immersion in cold water to remove any remaining amounts of dye and polymer.

In another embodiment of the present invention, permanent lamination of multiple layers of PVA film can be effected by using a "PVA glue" consisting of a solution of PVA in water (for example, 5% w/w of PVA, although the concentration is not critical), with a small amount (<1%) of surfactant optionally added to improve wetting, as necessary. This results in a very strong bond and can be used to create multiple film stacks. Although other types of adhesives, such as radiation activated, thermally activated or pressure sensitive can also be used, an 'all PVA' structure has the advantage of eliminating the introduction of polymeric materials that may have deleterious effects on the film and/or image (interfaces for potential adhesion failure, particulate inclusions, refractive index mismatch, interaction with the dichroic dyes or substrate, etc.).

In another embodiment of the current invention, the processes described above are used to form images with higher density than can be otherwise formed. Thus, a thin (non-supported) polarizing gradient with high density is formed using two bonded PVA films to produce a darker polarization gradient than can be achieved through the maximum uptake of dichroic dye by a single layer of PVA. This is achieved by printing gradients on two separate films and then laminating them together to form, effectively, a single film (using, for example, the above disclosed technique of PVA bonding). Separation of the imaged PVA layers from their carriers by peeling it from the (CTA) supports results in a thin film (<4 mils) with up to twice the optical density of a single film layer. As unsupported PVA layers are typically <2 mils (~<50 µm) thick, multiple layers can be combined to achieve a desired high density, with the film still remaining relatively thin.

In order to provide a thin polarizing filter/lens element for laminating between glass or plastic lenses or minimize thickness of multiple lamination plies, it is an aspect of the present disclosure to delaminate the PVA from the support layer (CTA, etc.) after removing the excess dye and holding layer and drying of the image. This is enabled by the use of PVA-to-CTA (or other support) lamination techniques that produce a minimally adequate bond strength between the PVA and support to later allow removal by mechanical delamination, such as by adjusting the lamination conditions (bonding fluid and additives) the two films, controlling the adhesion strength of the individual layers, or by the inclusion of a release layer such as known to the art, or any combination thereof.

Figure 5:
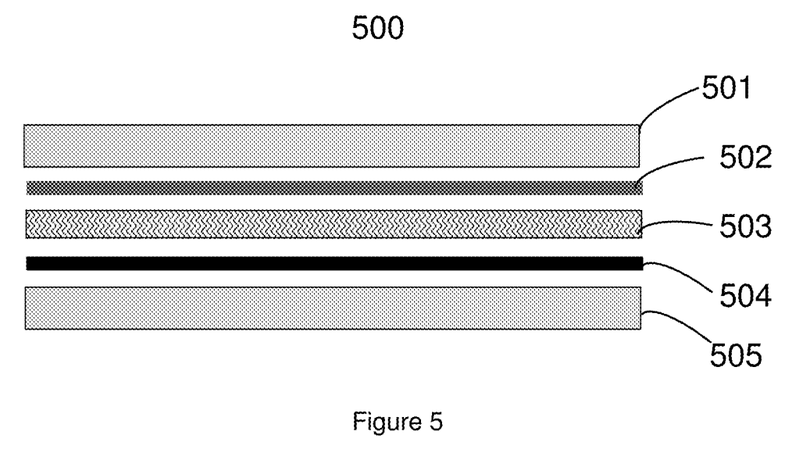
FIG. 5 shows a printed gradient filter lens bonded between two polycarbonate layers.

FIG. 5 illustrates the formation of a lens having a gradient polarized filter 500. Here, a free-standing stripped (delaminated) PVA layer or stack of layers 503, formed by the techniques described above, is bonded between two plastic optical films such as polycarbonate (501, 505). This is done, for example, using thermal or UV-cure adhesives 502, 504 to form the plastic/PVA/plastic sandwich. The laminate is thermal-vacuum molded into a finished lens. Such a laminate can also be thermal-vacuum formed between curved glass surfaces to produce glass lenses. Further, the use of an adhesive containing a non-dichroic dye can be used to raise the overall optical density or tint of the gradient lens.

Figure 6:
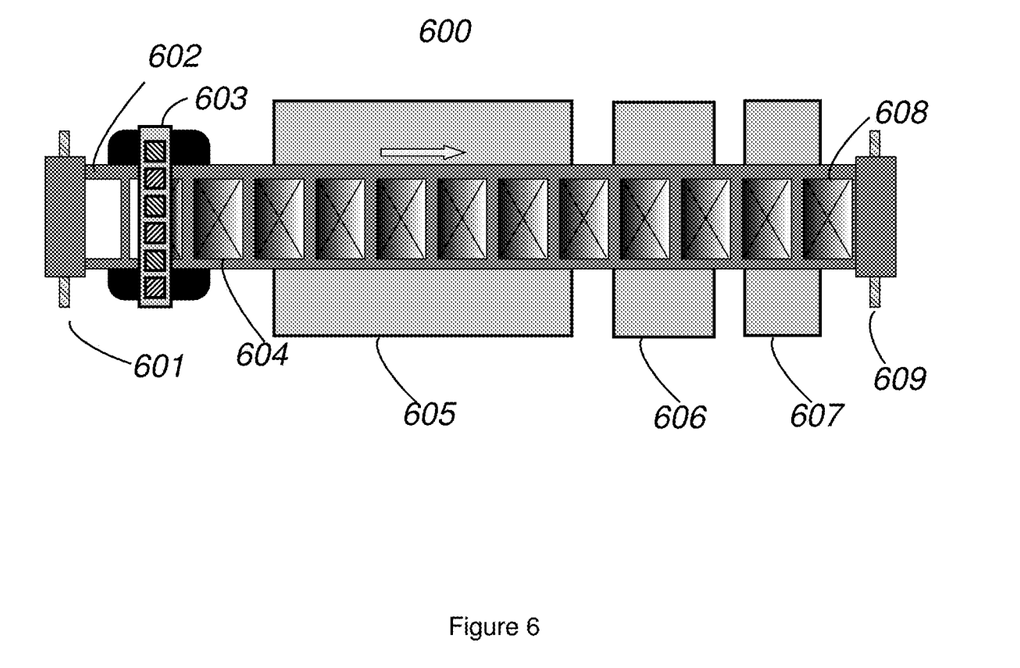
FIG. 6 is a schematic of a continuous process for producing gradient polarized images.

FIG. 6 schematically illustrates a continuous R2R method 600 for producing films with graded polarized images, where polymer-coated undyed oriented substrate 602 (such as stretched CMC-coated PVA on a CTA support) is supplied from an unwind stand 601, which is fed into ink-jet printer 603 which applies the dichroic ink. Printed substrate 604 then travels into humidity-controlled drying oven 605, where the dichroic dye is imbibed the substrate. The film then travels into zone 606 where the excess dye plus polymer layer is removed by any of the methods mentioned above. A final rinse and dry bath 607 produces a finished polarized gradient film 608 that is wound onto rewind spool 609. In-line die cutting is also possible (not shown). The finished selectively polarized frame 608 can be removed by in-line die cutting, in which case only the remaining material ('matrix') is rewound.

The components, steps, features, objects, benefits, and advantages that have been discussed are merely illustrative. None of them, or the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A method for fabricating a polarizing film having a degree of polarization that is varied in a pre-determined manner, the method comprising:
   a. providing a first substrate;
   b. bonding a second substrate to the first substrate, the second substrate comprising a polymer layer whose molecule structure is predominately oriented in one direction;
   c. forming a polymeric dye controlling layer over the second substrate;
   d. forming a dyed film by selectively applying one or more dyes onto the polymeric dye controlling layer;
   e. imbibing said selectively applied dyes into the second substrate by exposing the dyed film to an environment having controlled temperature and humidity for a fixed time;
   f. removing the dyed film from said controlled humidity and temperature zone; and
   g. forming a dyed image in the second substrate by removal of the polymeric dye controlling layer and excess dye from the second substrate.

2. The method of claim 1 wherein the second substrate comprises polyvinyl alcohol (PVA).

3. The method of claim 1 wherein the first substrate comprises cellulose triacetate (CTA).

4. The method of claim 1 wherein the polymeric dye controlling layer comprises carboxymethylcellulose (CMC).

5. The method of claim 1 wherein the selectively applied dyes include one or more of cyan, magenta, yellow and black colors.

6. The method of claim 5 wherein the selectively applied dyes are dichroic.

7. The method of claim 6 wherein the dichroic dyes are selectively applied to form a an intensity gradient in the polarizing film.

8. The method of claim 5 wherein the selectively applied dyes include both dichroic and non-dichroic dyes.

9. The method of claim 8 wherein the polarizing film is formed with a uniform visual appearance from a combination of a polarized gradient in one direction and a non-polarized gradient in the opposite direction.

10. The method of claim 1 wherein the polymeric dye controlling layer and any excess of the selectively applied dye are removed by water rinsing.

11. The method of claim 1 wherein the final dyed image is in the form of a graphic image, a continuous-tone image or a logo.

12. The method of claim 1 wherein the dyed image is separated from the first substrate.

13. The method of claim 12 wherein two or more of the separated dyed images are laminated together.

14. The method of claim 12 wherein lamination is achieved using an aqueous PVA adhesive.

15. The method of claim 1 wherein the dyed image is laminated between two non-polarizing substrates.

16. The method of claim 15 wherein the substrates include glass.

17. The method of claim 15 wherein the substrates comprise polycarbonate.

18. The method of claim 15 wherein the dyed image is a polarizing gradient pattern.

* * * * *